US011935345B2

(12) United States Patent
Lakomy et al.

(10) Patent No.: US 11,935,345 B2
(45) Date of Patent: Mar. 19, 2024

(54) METHOD OF CONTROLLING AN ELECTRONIC SAFE LOCK

(71) Applicants: Petr Lakomy, Liberec (CZ); Petr Chvatal, Jablonec nad Nisou (CZ); Ludwig A. J. Kersten, Kleve (DE)

(72) Inventors: Petr Lakomy, Liberec (CZ); Petr Chvatal, Jablonec nad Nisou (CZ); Ludwig A. J. Kersten, Kleve (DE)

( * ) Notice: Subject to any disclaimer, the term of this patent is extended or adjusted under 35 U.S.C. 154(b) by 59 days.

(21) Appl. No.: 17/800,789

(22) PCT Filed: Feb. 15, 2021

(86) PCT No.: PCT/CZ2021/050018

§ 371 (c)(1),
(2) Date: Aug. 18, 2022

(87) PCT Pub. No.: WO2021/164796

PCT Pub. Date: Aug. 26, 2021

(65) Prior Publication Data

US 2023/0081275 A1 Mar. 16, 2023

(30) Foreign Application Priority Data

Feb. 20, 2020 (CZ) .................................. CZ2020-86

(51) Int. Cl.
*G07C 9/00* (2020.01)

(52) U.S. Cl.
CPC ..... *G07C 9/00912* (2013.01); *G07C 9/00309* (2013.01)

(58) Field of Classification Search
None
See application file for complete search history.

(56) References Cited

U.S. PATENT DOCUMENTS 5,883,443 A * 3/1999 Wilson .................... B60R 25/24 340/426.36
9,980,020 B1 * 5/2018 Sharp ................. G07C 9/00174
(Continued)

FOREIGN PATENT DOCUMENTS

WO 2007087417 A2 8/2007

OTHER PUBLICATIONS

Czech Republic Search Report dated Jul. 7, 2020 for related Czech Republic Application No. PV 2020-86 which was filed on Feb. 20, 2020; 3 pages.
(Continued)

*Primary Examiner* — Carlos Garcia
(74) *Attorney, Agent, or Firm* — Hovey Williams LLP; Paul J. Walker

(57) ABSTRACT

A method of controlling an electronic safe lock (1) with an electronic unit (2) of the lock (1) and with an electronic remote control unit (3) wherein the blocking mode of the lock (1) unlocking is activable/deactivable from the remote controller (4), when an blocking signal (21)/remote unblocking signal (22) is generated in the remote controller (4) and this signal is transmitted via the electronic remote control unit (3) to the electronic unit (2) of the lock (1), where it blocks/unblocks the unlocking of the lock (1). Wherein in the blocking mode of the lock (1) unlocking, the lock (1) can also be unlocked from the local controller (5) by generating a local unblocking signal (23) and transmitting it to the electronic unit (2) of the lock (1), where it cancels the effect of the blocking signal (21). Subsequently, the internal unlocking signal is activated.

1 Claim, 5 Drawing Sheets

(56) References Cited

U.S. PATENT DOCUMENTS

| | | | | |
|---|---|---|---|---|
| 2005/0012595 | A1* | 1/2005 | Dewan | G07C 9/00857 340/5.72 |
| 2015/0248986 | A1 | 9/2015 | Flores Silguero | |
| 2015/0287256 | A1 | 10/2015 | Davis | |
| 2017/0356218 | A1 | 12/2017 | Beasley et al. | |
| 2019/0244456 | A1 | 8/2019 | Steinmetz | |
| 2020/0028672 | A1* | 1/2020 | Tang | H04L 9/3297 |

OTHER PUBLICATIONS

International Search Report and Written Opinion dated May 6, 2021 for related PCT Patent Application No. PCT/CZ2021/050018 which was filed on Feb. 15, 2021; 15 pages.

* cited by examiner

METHOD OF CONTROLLING AN ELECTRONIC SAFE LOCK

RELATED APPLICATIONS

This application is the National Stage of International Patent Application No. PCT/CZ2021/050018, filed Feb. 15, 2021, which is hereby incorporated herein by reference in its entirety, and which claims priority to Czech Patent Application No. PV 2020-86, filed Feb. 20, 2020, which is also incorporated herein by reference in its entirety.

TECHNICAL FIELD

The invention relates to a method of controlling an electronic safe lock with an electronic unit of the lock and with an electronic remote control unit wherein a blocking mode of the lock unlocking can be activated from a remote controller in such a way that an blocking signal is generated in the remote controller, the blocking signal is transmitted with the use of communication means via the electronic remote control unit to the electronic unit of the lock where the blocking signal blocks the unlocking of the lock, wherein the blocking mode of the lock unlocking is deactivable in such a way that a remote unblocking signal is generated in the remote controller and the remote unblocking signal is transmitted with the use of the communication means via the electronic remote control unit to the electronic unit of the lock where the remote unblocking signal cancels the blocking of the lock unlocking.

PRIOR ART

Safe locks are used for safe closing of safes and to prevent unauthorized opening of safes. Safe locks are produces either as key locks, locks with a mechanical combination dial or electronic locks.

Electronic safe locks comprise an electronic and a mechanical part of the lock. The mechanical part of the lock prevents opening of the safe door either by being directly inserted into the safe door or safe walls, or by being connected to the bolt mechanism of the safe. The electronic part of the lock is connected to a keypad for lock control. The electronic safe lock is integrated inside the safe, e.g. in the safe door, the keypad being installed on an outer wall or on the door of the safe. The primary function of an electronic safe lock is unlocking of the lock after entering the valid unlocking code by means of the keypad. The valid unlocking code activates an actuator in the electronic part of the lock that acts upon a mechanical part of the lock, e.g. a lock nose. Besides the said primary function, electronic safe locks also have more functions that can be activated from the keypad. They e.g. comprise the time-delay function when the lock, after entering of a valid unlocking code, is only unlocked after expiration of the set time delay. Another function is e.g. the time lock function when time periods are defined within which the lock can be unlocked. Outside these time periods, the lock remains locked even if the valid unlocking code is entered. A superordinate special code is usually defined for an electronic safe lock that is entered via the keypad and can be used to unlock the lock any time even if the time-delay or time lock function is active.

Electronic safe locks are currently often equipped with a remote control system of the lock. For this purpose, a remote controller, e.g. a mobile phone, and an electronic installed in the safe are used. The remote control makes it possible to remotely control and remotely monitor the electronic safe lock. However, the lock cannot be remotely unlocked with the remote control system to avoid violation of regulations valid for the security certification of locks. One of the functions of the remote control is to activate the blocking mode of the lock unlocking using a blocking code entered via the remote controller. In this mode, the lock cannot then be unlocked in any manner. Then, the electronic part of the lock accepts and evaluates signals from the keypad, but does not respond to them. The lock does not respond to user codes entered via the keypad, e.g. valid codes for unlocking of the lock, or administrator codes entered on the keypad, e.g. programming codes of the lock or the superordinate special code for unlocking of the lock. The blocking mode of the lock unlocking cannot be deactivated from the keypad. The only way of unlocking a lock that finds itself in the blocking mode of the lock unlocking consists in first using the unblocking code entered on the remote controller to deactivate the blocking mode of the lock unlocking, and after the deactivation, the lock can be unlocked in the standard way.

The blocking mode of the lock unlocking is advantageous in that the owner/administrator of the safe can permit opening of the safe without his/her presence at the safe and only at the moment defined by him/her. If the blocking mode of the lock unlocking is activated and an error or failure of the lock control means occurs, e.g. a failure of the communication network with the remote controller or a power supply failure of the electronic of the safe occurs, the blocking signal remains active and the lock is continuously in the blocking mode of the lock unlocking. Thus, in case of these errors or failures, the lock cannot be unlocked in any way in the blocking mode of the lock unlocking. This is inconvenient in situations that even in this mode the safe needs to be exceptionally opened, e.g. in case of a fire in the safe location so that the items stored in the safe should not get damaged.

DISCLOSURE OF INVENTION

The object of the invention is to eliminate the above-mentioned disadvantages, i.e. to enable unlocking of an electronic safe lock that finds itself in the blocking mode of the lock unlocking also from the installation location of the safe.

The said object is achieved using a method of controlling an electronic safe lock with an electronic unit of the lock and with an electronic remote control unit wherein a blocking mode of the lock unlocking can be activated from a remote controller in such a way that an blocking signal is generated in the remote controller, the blocking signal is transmitted with the use of communication means via the electronic remote control unit to the electronic unit of the lock where the blocking signal blocks unlocking of the lock, wherein the blocking mode of the lock unlocking is deactivable in such a way that a remote unblocking signal is generated in the remote controller and the remote unblocking signal is transmitted with the use of communication means via the electronic remote control unit to the electronic unit of the lock, where the remote unblocking signal cancels blocking of the lock unlocking, according to the invention the principle of which is that in the blocking mode of the lock unlocking, the lock can also be unlocked from the local controller in such a way that a local unblocking signal is generated in the local controller and the local unblocking signal is transmitted with the use of the local communication means to the electronic unit of the lock where the local unblocking signal cancels the effect of the blocking signal and subsequently an internal unlocking signal is activated to unlock the lock.

An advantage of the control method of an electronic safe lock according to the invention is that in the blocking mode of the lock unlocking it allows unlocking of the lock even if the blocking signal remains active, namely with the use of a signal generated in the local controller.

In a preferred embodiment of the method of controlling an electronic safe lock, the local unblocking signal cancels the effect of the blocking signal in such a way that it bridges the blocking signal, and subsequently, an internal unlocking signal is generated in the electronic unit of the lock to unlock the lock. The said bridging of the blocking signal is simple cancelling of the effect of the blocking signal even though the blocking signal is still active.

According to a preferred embodiment of the control method of an electronic safe lock, between the step of bridging of the blocking signal and the step of generating of the internal unlocking signal, a local unlocking signal is generated in the local controller and it is transmitted, with the use of local communication means, to the electronic unit of the lock, where subsequently an internal unlocking signal is generated to unlock the lock. The said method of unlocking the electronic safe lock involves the necessity to generate two signals in the local controller to unlock the lock, which enhances protection from unauthorized unlocking of the lock.

According to a preferred embodiment of the control method of an electronic safe lock, the local unblocking signal activates, before the step of bridging of the blocking signal, in the electronic unit of the lock, generation of an activation signal that is inserted before the signal from the lock bolt position sensor in the electronic unit of the lock in such a way that when the activation signal is generated, the electronic unit of the lock will evaluate the lock bolt position as unlocked, thus cancelling the blocking of lock setting, further, a setting signal is generated in the local controller to bridge of the blocking signal and the setting signal is transmitted with the use of local communication means to the electronic unit of the lock, where it will bridge the blocking signal. Further steps after bridging the blocking signal leading to unlocking of the lock are mentioned in the previous paragraphs. The said method of unlocking the electronic safe lock involves the necessity to generate three signals in the local controller to unlock the lock, which enhances protection from unauthorized unlocking of the lock even more. In addition, the said method uses the wiring and functions of the electronic unit of the lock without the necessity of internal modifications of the electronic unit of the lock.

BRIEF DESCRIPTION OF DRAWINGS

The method of controlling an electronic safe lock will be described in more detail with reference to examples of particular embodiments, schematically shown in the attached drawings.

DESCRIPTION OF PREFERRED EMBODIMENTS

Figure 1:
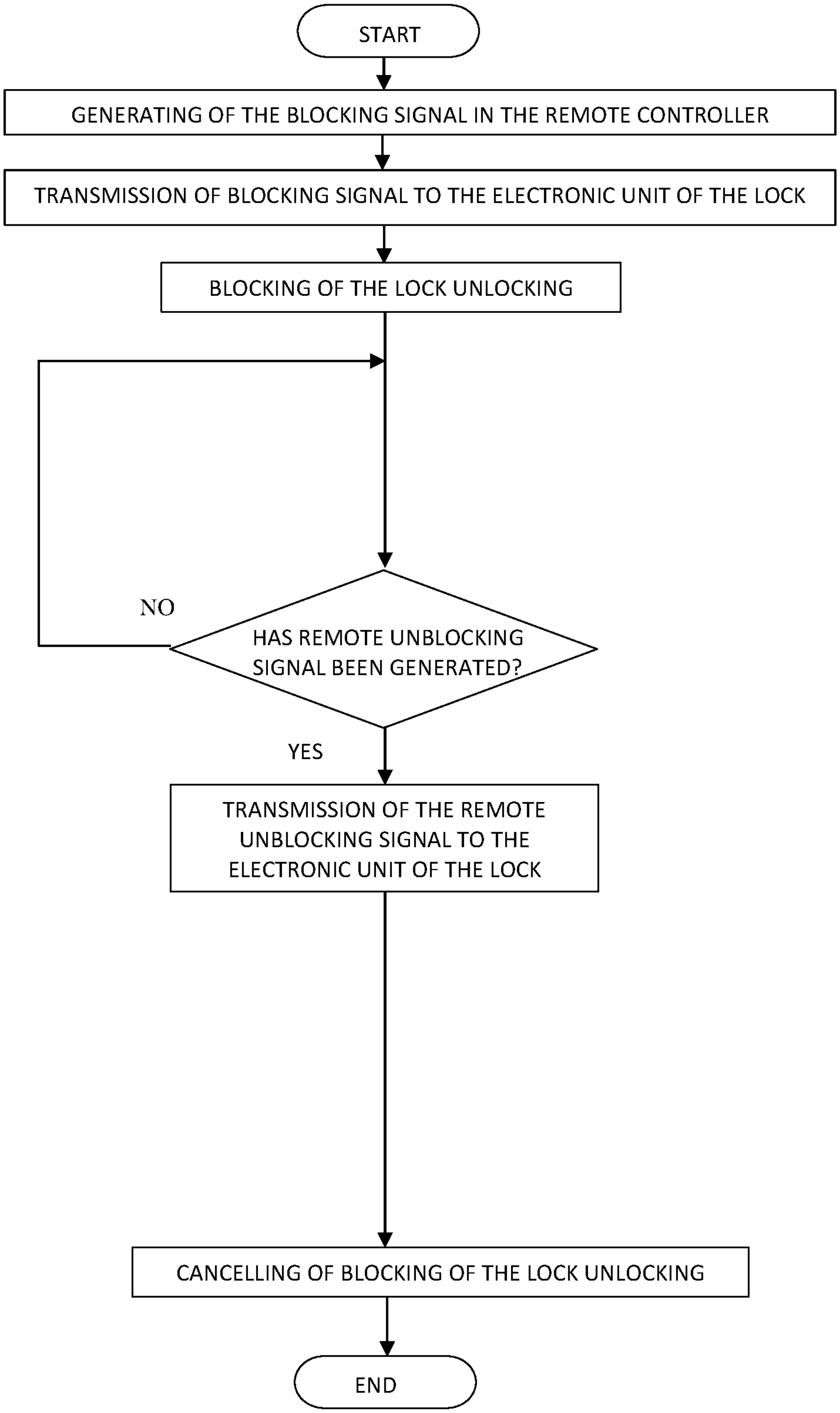
FIG. 1 shows a flow chart of a method of controlling an electronic safe lock in the blocking mode of the lock unlocking according to prior art.

FIG. 1 shows a flow chart of a method of controlling an electronic safe lock 1 in the blocking mode of the lock 1 unlocking according to the prior art. Electronic safe locks 1 according to the prior art are remotely blocked in such a way that after entering of the blocking code on the remote controller 4, an blocking signal 21 is generated in the remote controller 4. The blocking signal 21 is transmitted with the use of remote communication means 6 and local communication means 7 to the electronic unit 2 of the lock 1 (via the electronic remote control unit 3 of the lock 1) where the blocking signal 21 blocks unlocking of the lock 1. Blocking of the lock 1 unlocking is implemented in such a way that in the electronic unit 2 of the lock 1, passage of the internal unlocking signal 24 controlling the actuator 16 that moves the mechanical part 9 of the lock 1 is blocked. In the blocking mode of the lock 1 unlocking, the electronic unit 2 of the lock 1 keeps receiving and evaluating signals from the local controller 5 that are transmitted to the electronic unit 2 of the lock 1 with the use of the local communication means 7, but will not permit unlocking of the lock 1. In the blocking mode of the lock 1 unlocking, the unlocking of the lock 1 is also blocked if the proper lock 1 unlocking code is entered on the local controller 5. The only way of deactivating the blocking mode of the lock 1 unlocking and subsequent opening of the safe door consists in entering the remote unblocking code on the remote controller 4, which will generate the remote unblocking signal 22 in the remote controller 4. The remote unblocking signal 22 is transmitted with the use of remote communication means 6 and local communication means 7 to the electronic unit 2 of the lock 1 (via the electronic remote control unit 3 of the lock 1), where the remote unblocking signal 22 cancels the block of the lock 1 unlocking, i.e. the internal unlocking signal 24 is permitted to pass.

Figure 2:
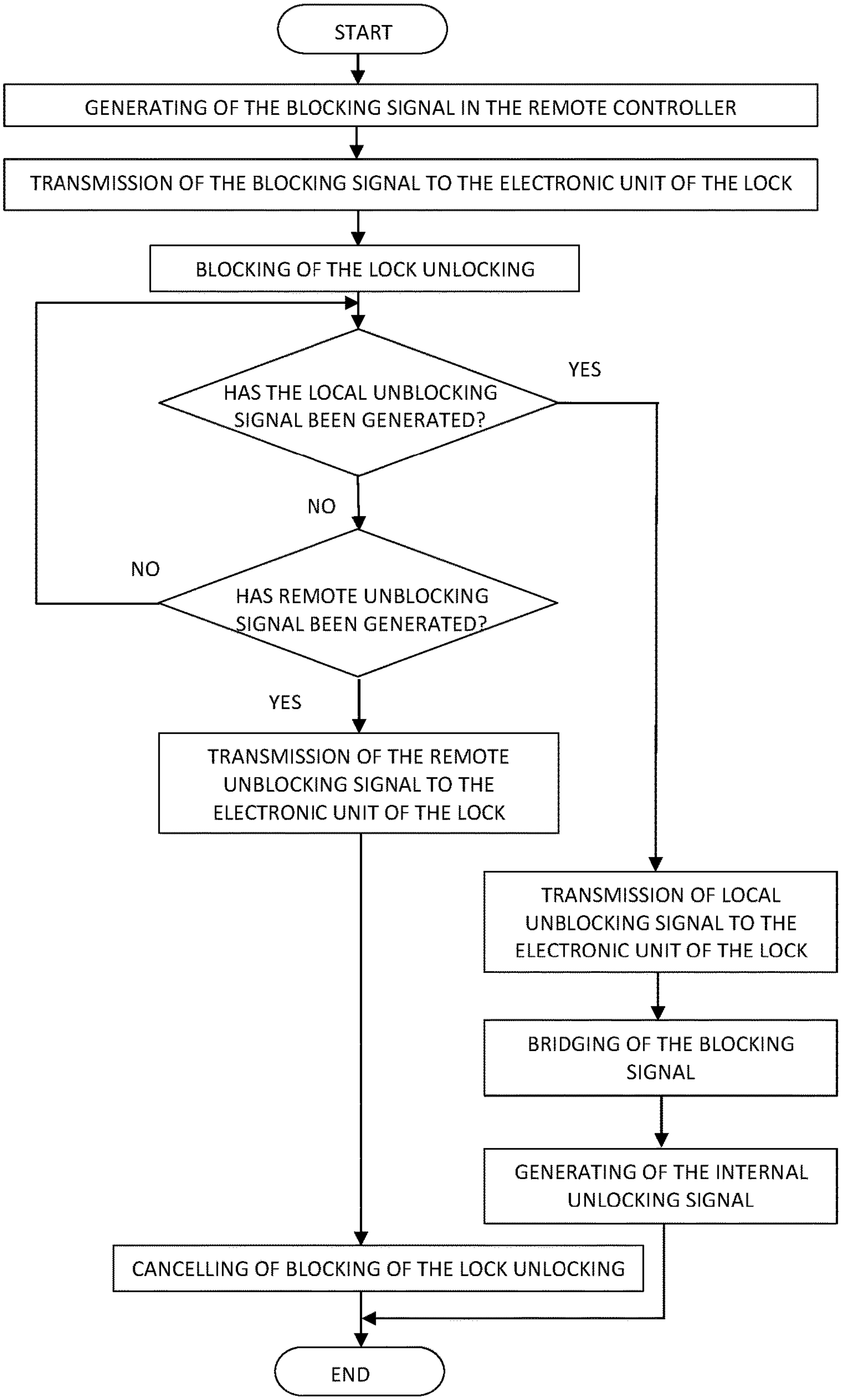
FIG. 2 shows a flow chart of the method of controlling an electronic safe lock in the blocking mode of the lock unlocking according to the present invention with steps permitting unlocking of the lock from the local controller as well by means of generating one signal in the local controller.

FIG. 2 shows a flow chart of the method of controlling an electronic safe lock 1 in the blocking mode of the lock 1 unlocking wherein this mode can be deactivated not only by generating the remote unblocking signal 22 in the remote controller 4, but the lock 1 can also be unlocked by generating the local unblocking signal 23 in the local controller 5. In the blocking mode of the lock 1 unlocking, after entering of the local unblocking code in the local controller 5, the local unblocking signal 23 is generated in the local controller 5 and the local unblocking signal 23 is transmitted with the use of the local communication means 7 to the electronic unit 2 of the lock 1. Here, the local unblocking signal 23 bridges the blocking signal 21. In general, bridging of the first signal by another signal means that the active another signal negates the function of the active first signal even though the first signal remains active (if e.g. the active status of the first signal is log. "0", after bridging, instead of the first signal, the another signal with the active status log. "1" is effective in the signal path). After bridging of the blocking signal 21, the internal unlocking signal 24 is generated in the electronic unit 2 of the lock 1. It further activates the actuator 16 that moves the mechanical part 9 of the lock 1. Thus, in this embodiment of the control method of an electronic safe lock 1, in the blocking mode of the lock 1 unlocking, the lock 1 can also be unlocked from the local controller 5, namely by means of one code entered on the local controller 5, namely of the local unblocking code.

Figure 3:
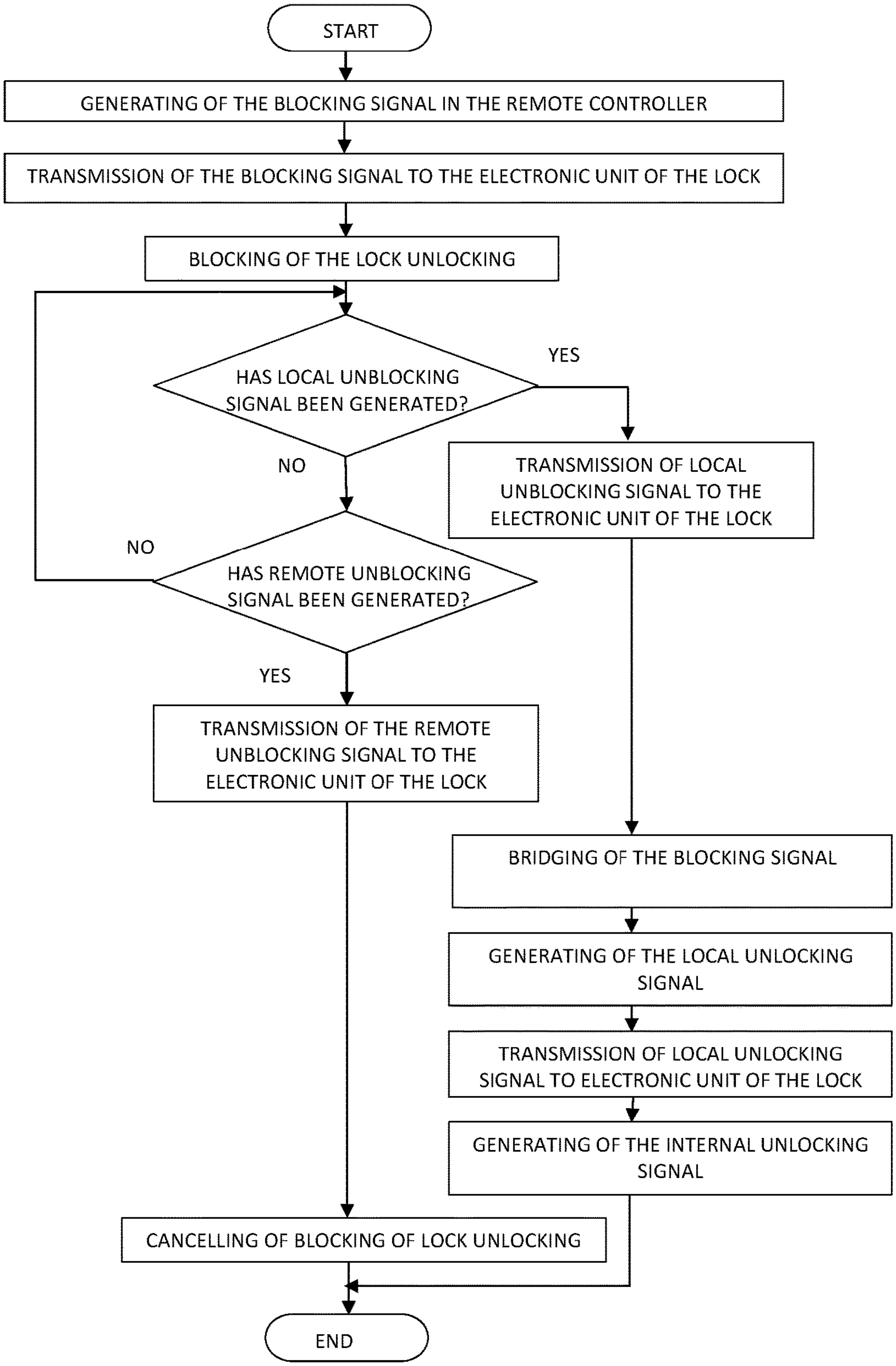
FIG. 3 shows a flow chart of the method of controlling an electronic safe lock in the blocking mode of the lock unlocking according to the present invention with steps permitting unlocking of the lock from the local controller as well by means of generating two signals in the local controller.

FIG. 3 shows a flow chart of the method of controlling an electronic safe lock 1 in the blocking mode of the lock 1 unlocking wherein this mode can be deactivated not only by generating of the remote unblocking signal 22 in the remote controller 4, but the lock 1 can also be unlocked by generating of the local unblocking signal 23 in the local controller 5. In the blocking mode of the lock 1 unlocking, after entering of the local unblocking code in the local controller 5, the local unblocking signal 23 is generated in the local controller 5 and the local unblocking signal 23 is transmitted with the use of the local communication means 7 to the electronic unit 2 of the lock 1. Here, the local unblocking signal 23 bridges the blocking signal 21. The next step consists in generating of the local unlocking signal 25 in the local controller 5, which is generated by entering of the local unlocking code on the local controller 5. The local unlocking signal 25 is transmitted with the use of the local communication means 7 to the electronic unit 2 of the lock 1. In the next step, the internal unlocking signal 24 is generated in the electronic unit 2 of the lock 1. It further activates the actuator 16 that moves the mechanical part 9 of the lock 1. Thus, in this embodiment of the control method of an electronic safe lock 1, in the blocking mode of the lock 1 unlocking, the lock 1 can also be unlocked from the local controller 5, namely by means of two manual control steps. The first step consists in entering the local unblocking code and the second step consists in entering the local unlocking code on the local controller 5.

Figure 4:
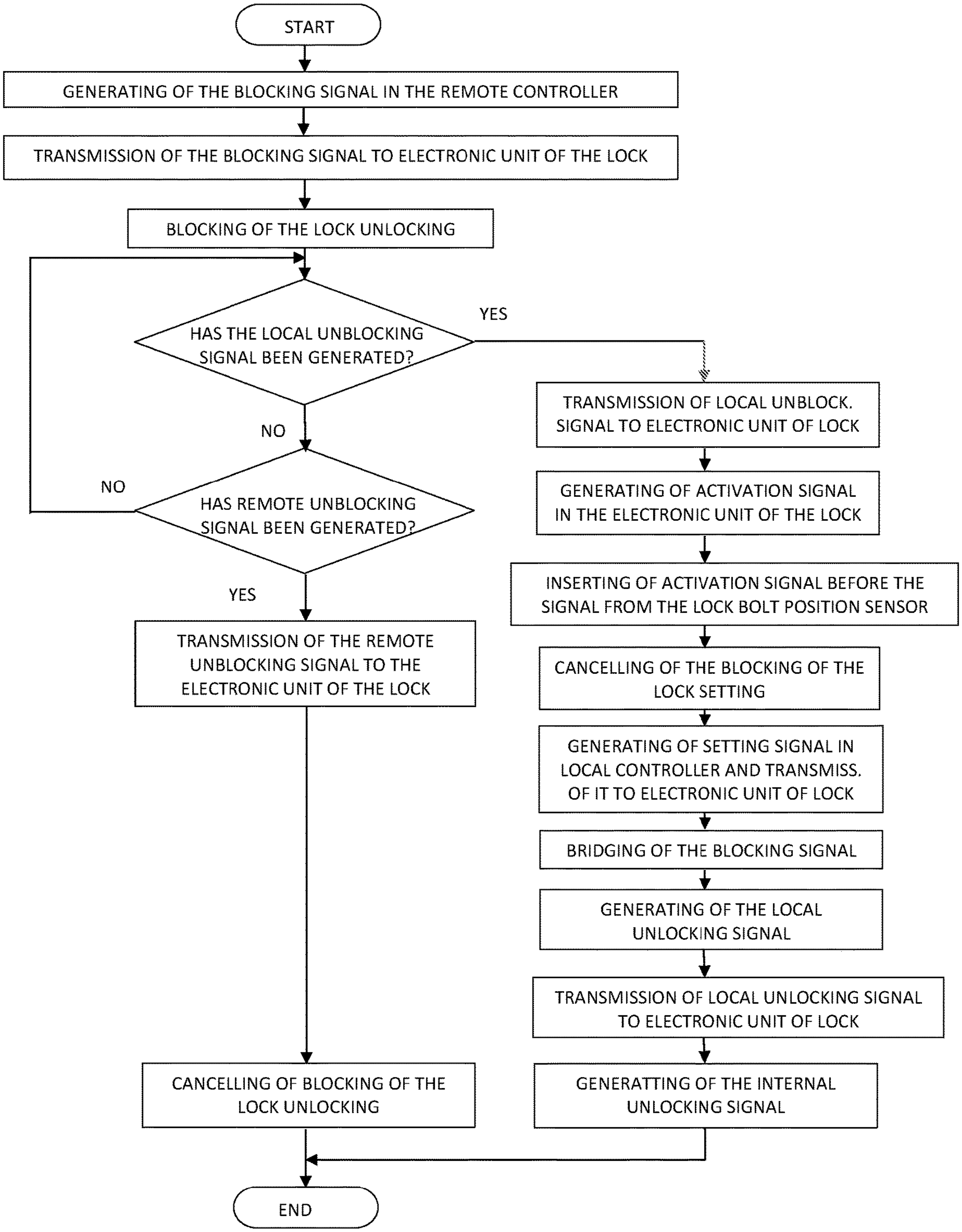
FIG. 4 shows a flow chart of the method of controlling an electronic safe lock in the blocking mode of the lock unlocking according to the present invention with steps permitting unlocking of the lock from the local controller as well by means of generating three signals in the local controller.

FIG. 4 shows a flow chart of the method of controlling an electronic safe lock 1 in the blocking mode of the lock 1 unlocking wherein this mode can be deactivated not only by generating the remote unblocking signal 22 in the remote controller 4, but the lock 1 can also be unlocked by generating the local unblocking signal 23 in the local controller 5. Unlike the embodiment of the control method of FIGS. 2 and 3, the lock is unlocked with the use of three manual control steps. In the embodiment of the control method of FIG. 4, such a characteristic of the lock 1 is used where in the electronic unit 2 of the lock 1, the signal 27 from the lock 1 bolt position sensor 13 is checked, where the signal 27 is the signal of the lock 1 bolt position in the mechanical part 9 of the lock 1. If this signal indicates that the lock 1 is locked, in the electronic unit 2 of the lock 1, the signal of blocking of the lock 1 setting is generated. Thus, the lock 1 can only be set if the lock 1 is unlocked. The steps of unlocking of the lock 1 are as follows. After entering of the local unblocking code on the local controller 5, the local unblocking signal 23 is generated in the local controller 5 and the local unblocking signal 23 is transmitted with the use of the local communication means 7 to the electronic unit 2 of the lock 1. The local unblocking signal 23 activates the generating of the activation signal 26 in the electronic unit 2 of the lock 1. (The activation signal 26 is the silent alarm signal. The silent alarm signal is a standard signal in electronic safe locks 1 that is generated after entering of a special code on the local controller 5 and that is used by the lock user to "inconspicuously" indicate, e.g. to the safe administrator, that he/she entered the code on the local controller 5 under pressure.) The activation signal 26 is transmitted with the use of the local communication means 7 to the electronic remote control unit 3 and from there it is inserted (by transmission along a fixed connection between the units 2, 3) before the signal of the lock 1 bolt position sensor 13 in the electronic unit 2 of the lock 1. (Inserting before means that the locked lock 1 state indicated from the lock 1 bolt position sensor 13 is conditional by the activation signal 26. If the activation signal 26 is not active, the locked lock 1 status is evaluated in the electronic unit 2 of the lock 1 as active. And conversely, if the activation signal 26 is active, the locked lock 1 status is evaluated as inactive, i.e. as the lock 1 being unlocked.) Thus, the generated activation signal 26 permits setting of the lock (see above). Further, a setting code is entered on the local controller 5, and the setting code is used to generate the setting signal 28 in the local controller 5. The setting signal 28 is transmitted with the use of the local communication means 7 to the electronic unit 2 of the lock 1, where it bridges the blocking signal 21. Further, a local unlocking code is entered on the local controller 5, and the local unlocking code is used to generate the local unlocking signal 25 in the local controller 5. The local unlocking signal 25 is transmitted with the use of the local communication means 7 to the electronic unit 2 of the lock 1, where the internal unlocking signal 24 is generated. It further activates the actuator 16 that moves the mechanical part 9 of the lock 1. Thus, in this embodiment of the control method of an electronic safe lock 1, in the blocking mode of the lock 1 unlocking, the lock 1 can also be unlocked from the local controller 5, namely by means of three manual control steps. The first step consists in entering the local unblocking code, the second step consists in entering the setting code and the third step consists in entering the local unlocking code on the local controller 5.

The method of controlling an electronic safe lock 1 according to FIG. 4 assumes the initial status before the blocking of the lock 1 unlocking, in which the electronic unit 2 of the lock 1 evaluates the signal 27 from the lock 1 bolt position sensor 13. The local unblocking code is entered on the local controller (keypad) by pressing the key 6 for 2 seconds and subsequently by entering the manager code with the last digit increased by one. The setting code is the numeric sequence 001. After unlocking of the lock 1, the bridging of the blocking signal 21 must be cancelled to ensure its further operation with the possibility to activate the blocking mode of the lock 1 unlocking. This is accomplished by pressing the key 6 for 2 seconds, then entering the manager code and further the code for activating the evaluation of the blocking signal 21.

Persons skilled in the art will find it obvious that the blocking method of the lock 1 unlocking can be implemented in various way that will prevent the activation of the actuator 16. Also, persons skilled in the art will find it obvious that the bridging and insertion before the signals can be accomplished in various ways to obtain the same status as described above.

Figure 5:
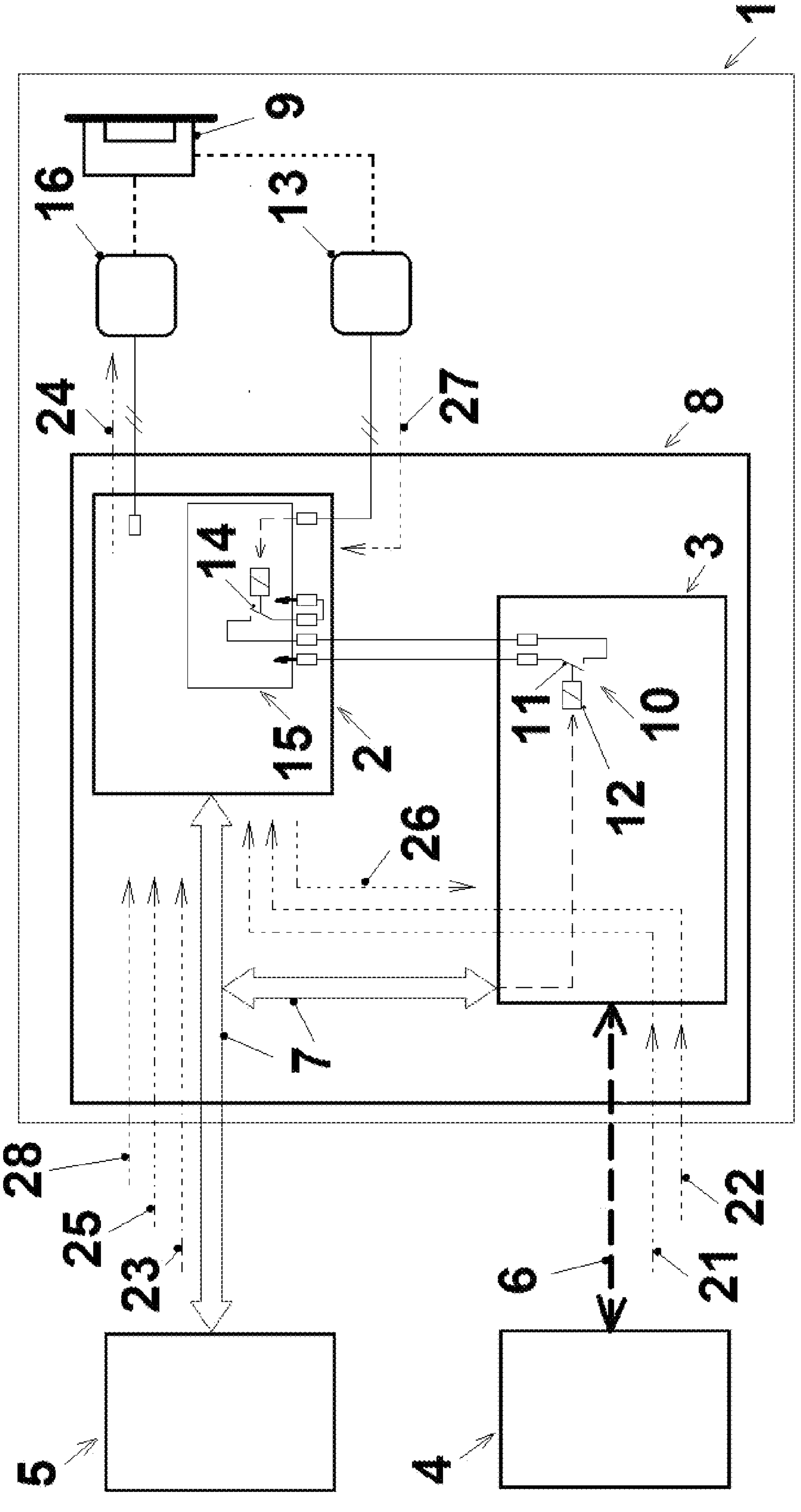
FIG. 5 shows a general diagram of an assembly of an electronic safe lock with a local controller and a remote controller and with the controlled switch arranged in the electronic remote control unit.

FIG. 5 shows a general diagram of the assembly of an electronic safe lock 1 with a local controller 5 and with a remote controller 4. The electronic safe lock 1 comprises the electronic part 8 of the lock 1 and the mechanical part 9 of the lock 1, which are interconnected via the actuator 16 and the lock 1 bolt position sensor 13. The electronic part 8 of the lock 1 comprises the electronic unit 2 of the lock 1 and the electronic remote control unit 3. The electronic unit 2 of the lock 1 is connected to the local controller 5 with the use of the local communication means 7. The local communication means 7 are represented by a serial bus. The local controller 5 is a keypad situated on the front wall of the safe door. The electronic remote control unit 3 is connected to the remote controller 4 with the use of remote communication means 6. The remote communication means 6 are a mobile data network of the GSM technology. The remote controller 4 is a mobile phone with an installed mobile application for remote control and monitoring of the lock 1.

The electronic units 2, 3 are connected with local communication means 7. The electronic remote control unit 3 is connected with the use of the communication means in such a way that it should not interrupt the communication between the electronic unit 2 of the lock 1 and the local controller 5. This connection is implemented as a bus divider of the "T" type and is protected with an optical separation by means of a pair of photo-diodes and photo-transistors (not shown in FIG. 5). Thus, communication between the electronic unit 2 of the lock 1 and the local controller 5 will remain maintained even in case of a failure of the electronic remote control unit 3.

The lock 1 bolt position sensor 13 and the actuator 16 are connected to the electronic unit 2 with fixed wires, not along a bus. The actuator 16 is electrically connected to the output from the electronic unit 2 of the lock 1 and is mechanically connected to the bolt of the lock 1 in the mechanical part 9 of the lock 1. Activation of the actuator 16 moves the bolt of the lock 1. The electronic unit 2 of the lock 1 comprises a lock control module (not shown in FIG. 5) and a lock 1 blocking module 15 that comprises circuits for blocking of the lock. The lock 1 bolt position sensor 13 is electrically connected to the lock 1 blocking module 15. The contact 14 of the lock 1 bolt position sensor 13 is arranged in the lock 1 blocking module 15 and is controlled by the control signal 27 from the sensor 13. The contact 14 of the sensor 13 is a relay contact of the NC type.

In the electronic remote control unit 3, a controlled switch 10 is arranged that comprises the contact 11 of the controlled switch 10 and the control part 12 of the controlled switch 10. The contact 11 of the controlled switch 10 is connected with fixed wires to the lock 1 blocking module 15. The control part 12 of the controlled switch 10 is interconnected with the use of the local communication means 7 with the output of the electronic unit 2 of the lock 1 to output of the activation signal 26. The controlled switch 10 is a relay of the NC type. The contacts 11 and 14 are connected in series. Closed contact 14 of the lock 1 bolt position sensor 13 represents the locked state of the lock 1. The contact 11 of the controlled switch 10 is closed in the inactive status. If the activation signal 26 connected to the control part 12 of the controlled switch 10 is active, the contact 11 of the controlled switch 10 is open and since it is connected in series with the contact 14 of the lock 1 bolt position sensor 13, the lock 1 blocking module 15 evaluates this status as the lock 1 being unlocked though the lock 1 is still locked and the contact 14 of the lock 1 bolt position sensor 13 is still closed. This evaluation enables further steps to control the electronic safe lock 1 described above to unlock the lock 1 from the local controller 5 in the blocking mode of the lock 1 unlocking. The activation signal 26 is the silent alarm signal, being a standard signal of electronic safe lock 1, which is the only signal generable in the electronic unit 2 of the lock 1 in the blocking mode of the lock 1 unlocking. Thus, it is the only signal that can be used to control the controlled switch 10 of the lock 1 without the necessity to modify the electronic unit 2 of the lock 1.

The electronic unit 2 of the lock 1 comprises a processor and a memory. The electronic remote control unit 3 comprises a processor of the 8-bit ATmega328p type and a memory of the Flash 32 KB, SRAM 2 KB, EEPROM 1 KB type.

A person skilled in the art will find it obvious that the above-mentioned embodiment examples are only some of many possible embodiments of this invention. In other embodiments, e.g. the controlled switch 10 may be implemented as a transistor switch, the controlled switch 10 may be situated in the electronic unit 2 of the lock 1, the contact 14 of the lock 1 bolt position sensor 13 may be arranged directly in the lock bolt position sensor 13 and so it is not implemented by means of a relay in the lock 1 blocking module 15, the activation signal 26 may be connected to the electronic remote control unit 3 with fixed wires, no along a bus, the remote communication means may refer to the WiFi technology etc.

A person skilled in the art will also find it obvious that embodiments of this invention may be implemented as both HW means, and SW means, or their combination. In the case of SW means, the signals represent e.g. the status log. "0" and log "1", the contacts may also be implemented as log. "0" and log "1", the active status of the signals are checked e.g. with program instructions of conditions as well as signal bridging, the serial connection of the contacts is e.g. their logical AND, serially connected contacts may be evaluated by SW through their status etc.

LIST OF REFERENCE SIGNS

1 lock
2 electronic unit of the lock
3 electronic remote control unit
4 remote controller
5 local controller
6 remote communication means
7 local communication means
8 electronic part of the lock
9 mechanical part of the lock
10 controlled switch
11 contact of the controlled switch
12 control part of the controlled switch
13 lock bolt position sensor
14 contact of the lock bolt position sensor
15 lock blocking module
16 actuator
21 blocking signal
22 remote unblocking signal
23 local unblocking signal
24 internal unlocking signal
25 local unlocking signal
26 activation signal
27 signal from the lock bolt position sensor
28 setting signal

The invention claimed is:

1. A method of controlling an electronic safe lock using a local controller and a remote controller, comprising:

wherein the local controller and the remote controller are situated outside of the lock, wherein the lock comprises an electronic part and a mechanical part, wherein the electronic part comprises an electronic unit and an electronic remote control unit connected with each other with local communication means, wherein the electronic unit is connected to the local controller with the use of the local communication means, wherein the electronic remote control unit is connected to the remote controller with the use of remote communication means, wherein, in the electronic unit, a signal from a lock bolt position sensor indicating a lock bolt position in the mechanical part of the lock is checked and, if the signal from the lock bolt position sensor indicates that the lock is locked, in the electronic unit of the lock, a signal of blocking of the lock setting is generated so that the lock can only be set if the lock is unlocked;

wherein a blocking mode of the lock unlocking can be activated from the remote controller in such a way that a remote blocking signal is generated in the remote controller, the remote blocking signal is transmitted with the use of the local communication means and the remote communication means via the electronic remote control unit to the electronic unit of the lock, where the remote blocking signal blocks of the lock unlocking, wherein the blocking mode of the lock unlocking is deactivable in such a way that a remote unblocking signal is generated in the remote controller and the remote unblocking signal is transmitted with the use of the local communication means and the remote communication means via the electronic remote control unit to the electronic unit of the lock, where the remote unblocking signal cancels the blocking of the lock unlocking, wherein, while in the blocking mode of the lock unlocking, the lock can be unlocked from the local controller in such a way that a local unblocking signal is generated in the local controller by entering of a local unblocking code on the local controller and the local unblocking signal is transmitted with the use of the local communication means to the electronic unit of the lock, the local unblocking signal activates a step of generating an activation signal that is inserted before the signal from the lock bolt position sensor in the electronic unit of the lock in such a way that when the activation signal is generated, the electronic unit of the lock always evaluates the lock bolt position as unlocked, thus cancelling the blocking of lock setting, further followed by the steps of generating a setting signal generated in the local controller by entering a setting code on the local controller and transmitting the setting signal with the use of the local communication means to the electronic unit, wherein the setting signal cancels the effect of the remote blocking signal, wherein a local unlocking signal is generated in the local controller by entering of a local unlocking code on the local controller, and the local unlocking signal is transmitted with the use of the local communication means to the electronic unit of the lock and subsequently an internal unlocking signal is activated to unlock the lock.

* * * * *